Dec. 21, 1965   J. C. PETERSON   3,224,548
TRANSFER CONVEYOR
Filed March 23, 1964   3 Sheets-Sheet 1
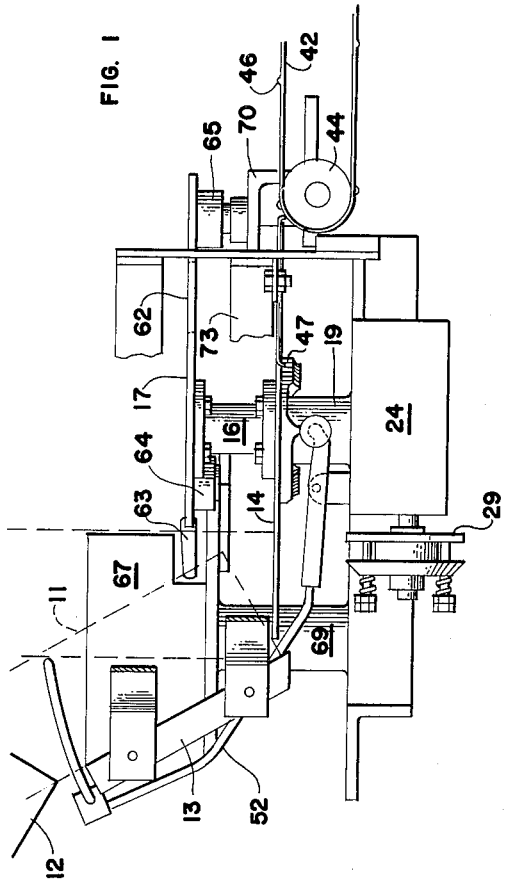
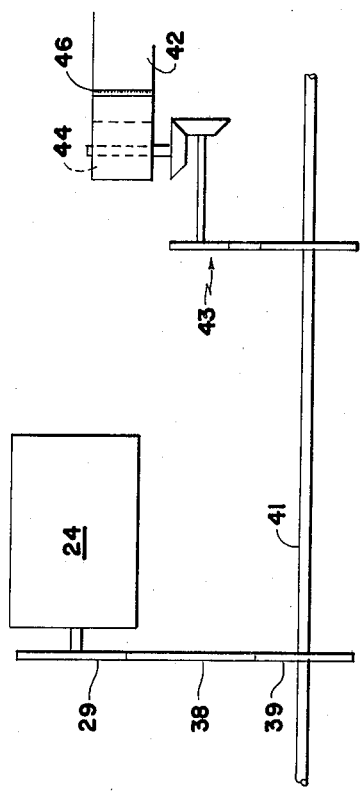
INVENTOR.
JOHN C. PETERSON
BY Paul Bliven

INVENTOR.
JOHN C. PETERSON

Dec. 21, 1965   J. C. PETERSON   3,224,548
TRANSFER CONVEYOR

Filed March 23, 1964   3 Sheets-Sheet 3

INVENTOR.
JOHN C. PETERSON
BY Paul Bliven

United States Patent Office 3,224,548
Patented Dec. 21, 1965

3,224,548
TRANSFER CONVEYOR
John C. Peterson, 124 Atkinson Lane, Watsonville, Calif.
Filed Mar. 23, 1964, Ser. No. 354,079
5 Claims. (Cl. 198—25)

The present invention relates in particular to a transfer conveyor for taking two-quart rectangular milk cartons from a former and transferring them to a fill line conveyor leading thru a closure former, filler, and sealer. The cartons are stripped from former dies so as to pass downwardly of an inclined chute with their closed bottoms forward. From the forming dies and chute, each carton must be set on its closed end, rotated a quarter turn, and spaced and located properly on the fill line conveyor.

The objects of the present invention consist of devising a transfer device that will take the cartons from the former chute and perform therewith the above mentioned acts by simple and effective means.

These objects, and others that will be apparent from the description hereinafter, are achieved by the use of a turntable at the lower end of the former chute on which the cartons are set upright by an arm and fingers that, also, serve to block the chute so as to achieve a general required spacing. Accurate spacing is achieved by a combination of features, as follows: Located two to four inches above the turntable and secured axially thereof is a sprocket turning with the table. An endless chain meshes with the drive sprocket with a tight run against which the carton is received and a slack run that moves the cartons off the turntable at substantially a right angle to the tension run. Two idlers and the drive sprocket give a triangular chain path. The chain is provided with equidistantly spaced lugs extending outwardly of the path. The radii of the table and drive sprocket differ by substantially the width of the carton, and the radius of the sprocket is less than twice the carton width. The purpose of the small drive sprocket is to provide a larger relative movement between the chain and the table during the slack run take off than would be possible with larger sprockets and tables, so that a carton is aided by both a chain lug and the table in crossing a dead plate to the fill line conveyor. This allows accurate synchronism between the transfer conveyor and the fill line conveyor, precise spacing of the cartons on the conveyors. Also, means are provided to time the arm that blocks carton feed, with the table rotation.

The device described briefly above is hereafter described in detail and illustrated in the accompanying drawings, in which:

FIGURE 1 is an elevational view of the transfer conveyor, and includes portions of the feed chute, and fill line conveyor.

FIGURE 2 is a schematic plan view of the driving shaft for and between the transfer conveyor and the fill line conveyor.

Figure 3:
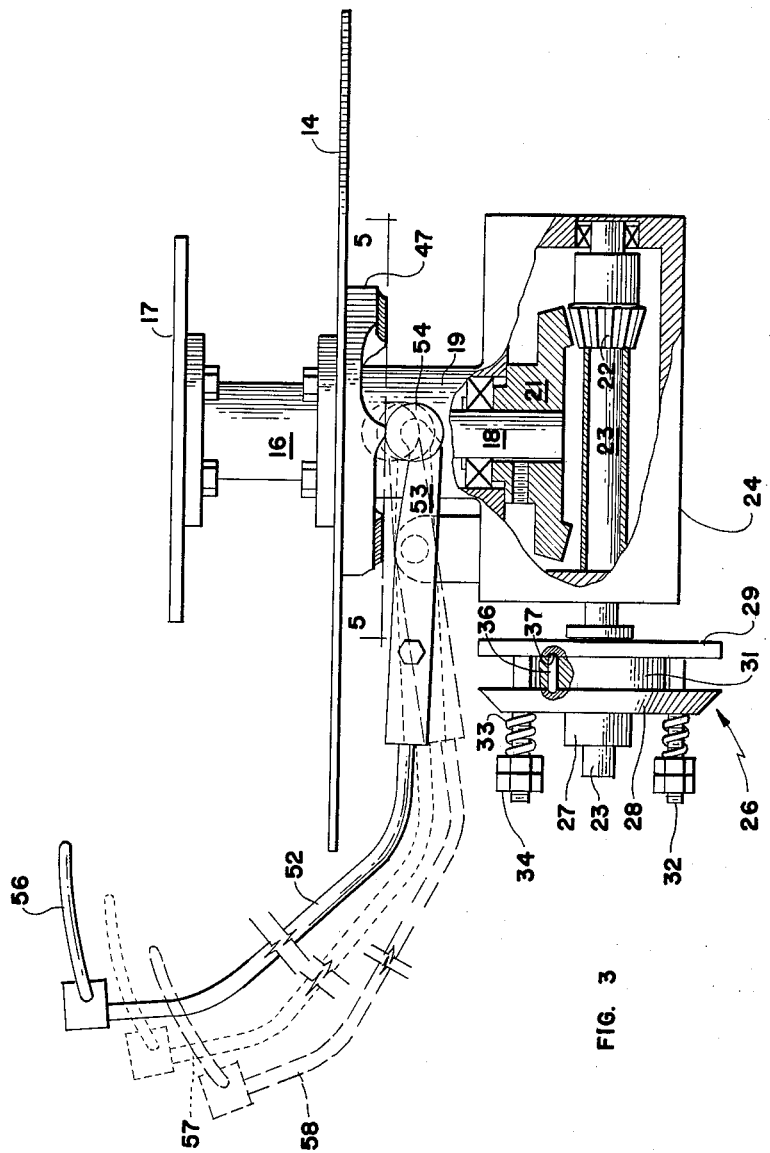
FIGURE 3 is an elevational view, partly in section on the line 3—3 of FIGURE 4.

Cartons 11 are stripped from a forming die and delivered closed bottom first down a chute arrangement of an upper chute 12 and a lower chute plate 13 that has its lower edge adjacent the edge of a turntable 14. This table has secured axially thereof a pedestal 16 and on top of the pedestal a chain sprocket 17. The table, pedestal, and sprocket are secured together for rotation about the axis of and by a vertical shaft 18 journaled in a sleeve 19. The upper end of the shaft is secured to the table-sprocket assembly with the lower end to a driven bevel gear 21 in mesh with a smaller drive bevel gear 22 secured to a drive shaft 23 at right angles to the driven shaft 18. The gears are housed in a box 24, and the drive shaft 23 is journaled in bearings carried in the side walls of the box.

One end of the drive shaft, the left end in the drawings, extends outboard of the box. This outboard end of the drive shaft has a single revolution overload, or slip, clutch 26 secured thereon. This clutch comprises a medially flanged sleeve 27 secured to the shaft, a disc 28, 29 on each side of the flange 31, and studs 32, springs 33, and nuts 34 that resiliently join the discs together, and pin detents 36 located in axially positioned holes in the flange 31. The discs are coaxial of the sleeve 27, and free to rotate on and with respect to the hub but for the detents 36 and the pressure thereon of the discs caused by the springs 33 surrounding the studs 32. Pressure is applied to the springs by confinement between the nuts 34 and left disc 28. Each stud is secured at one end to the right disc 29, extends to the left, and is slidable in a hole in the left disc. Each detent is at a different radial distance from the sleeve axis. Each end of each detent is rounded, and a shallow recess 37 is provided in each disc in alignment with a detent end. Thus the detents will align with and position in the recesses 37 in only one relative position of the discs with respect to each other. This makes the clutch a single revolution clutch that functions whenever rotation of the driven shaft is restricted while the clutch discs rotate. The right disc 29 has its periphery toothed to mesh with an endless drive chain 38, FIGURE 2.

The drive chain 38 extends around the driven sprocket 29 and a drive sprocket 39 secured on a line shaft 41 that is rotated by means not shown. The line shaft, also, drives a filling line conveyor 42 by means of a power train 43 generally indicated in FIGURE 2. From the line shaft, the train ends at a drum 44 around which the conveyor belt 42 passes. The filling line conveyor 42 is provided with a series of cleats 46 equidistant therealong. The effect of the total power train between the filling line conveyor belt 42 and the turntable 14 is that the table makes one revolution while the belt travels the distance of three intervals between cleats 46, and the slip clutch 26 makes three revolutions. Thus, if the clutch slips it will, when it stops slipping, resynchronize one of the cleats 46 with a third point on the periphery of the table.

Figure 5:
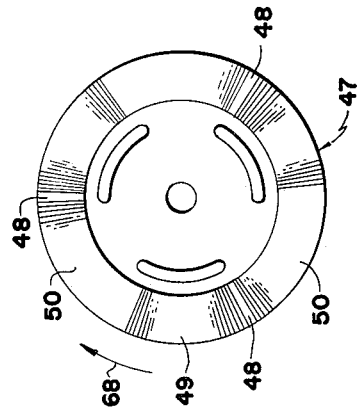
FIGURE 5 is a detail view of the face of a cam shown in elevation in FIGURES 1 and 3, and is taken on the line 5—5 of FIGURE 3.

This synchronizing of the fill line conveyor cleats 46 with third points on the table is required because it is desired that three cartons pass over the table for each revolution thereof. The feeding of cartons to the table is timed with respect thereto by three cams formed in the lower face of an annular cam 47 secured to the under side of the table and coaxial thereof. A face view of this cam is shown in FIGURE 5, this view being taken on the line 5—5 of FIGURE 3. The configurations of this cam face may be described as extending from the annular body of the cam. The cam surfaces are: three highs 48 of short peripheral length, three lows 49, and three intermediates 50. The lows and intermediates are of about equal length. Each cam feature, such as the highs, is peripherally equally spaced.

Pivoted in ears secured to the top of the gear box 24 is a rocker having offset arms 52, 53 of which the right one 53 serves to carry at its outer end a roller 54 that serves as a cam follower for the cam 47, and the rocker and follower are so formed and placed. The other arm 52 of the rocker, the carton engaging arm, extends outwardly and then upwardly from under the table 14 and under the lower chute plate 13 where its outer end has adjustably secured thereto, and as a part thereof, a pair of upwardly extending fingers 56. These fingers are curved to a radius from the pivotal axis of the rocker. The rocker arms and cams are shaped and proportioned to effect the following action each third revolution of the table, and starting from the fingers being raised, the full line position 52: This raised position is of short duration, two or three degrees of cam and table travel. From the raised position the fingers drop to the intermediate position 57 where they continue to block the descent of cartons from the upper chute 12 for about fifty-five degrees, then the fingers drop further to the low position 58 to clear the upper chute for about thirty-two degrees of cam travel to allow a carton to descend the chute to the edge of the table. Each transition phase, rise or fall, of the cam takes about ten degrees. Thus each cycle, the three positions 52, 57, and 58, of rocker 52–53 movement takes a third of a revolution of the cam, three cycles per revolution. With a carton lying inclined on the lower chute plate 13, the rocker arm 52 and fingers 56 rise to the full line raised position 52 and in doing so block the upper chute 12 and contact the carton on the plate to place it normal to the table and against the sprocket 17. In rising to the raised position, an intermediate part of the arm 52 extends thru a slot 61 at the lower edge of the lower chute plate 13 to contact the lower edge of the carton to, with the fingers 56, move it across the table so that the carton contacts the sprocket 17. As soon as the carton is upright, the arm and fingers lower to the intermediate blocking position 57.

Meshing with the sprocket 17 is an endless chain 62 that has secured thereto equidistant lugs 63 that extend outwardly of the path of travel of the chain. The chain being driven by the sprocket 17, has a tight run that is opposite the chutes and a slack run that is substantially at right angles to the tight run. The path of the chain is triangularly shaped by two idlers 64, 65. The tight run of the chain is between the left idler 64 and the sprocket 17, and the slack run is between the sprocket and the right idler 65. The spacing between the chain lugs 63 is a third of a revolution of the table, and the lugs are timed to the rocker movement so that a lug moves thru an opening in a fence 67 just as the carton is placed upright on the table. The direction of rotation of the table is counter clockwise in FIGURE 4, as shown by the rotational arrow 68, and the fence 67 is secured to and parallel to the clockwise edge of the lower chute plate 13 and extends therefrom across the table to adjacent the tight run of the chain. The lower edge of the fence clears the table and the upper edge should be above the center of the upright cartons.

Figure 4:
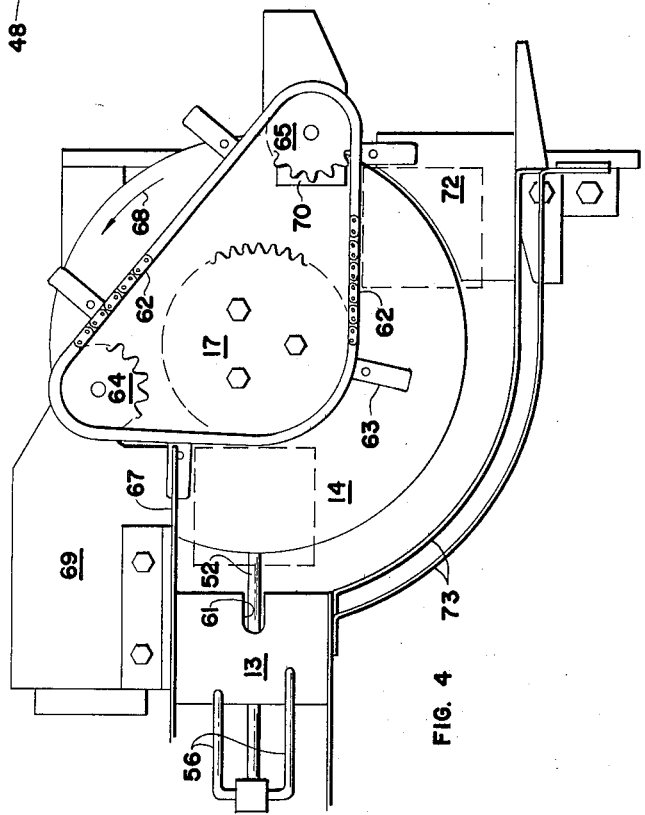
FIGURE 4 is a plan view of the transfer conveyor enlarged over the view of FIGURE 1 and omitting parts thereof.

The left idler 64 is substantially inside the edge of the table while the right idler is mostly outside the table edge, as viewed in plan in FIGURE 4. Brackets 69, 70 support the idlers inposition and these brackets are, in turn, supported in and are secured to the top of the gear box 24. The left bracket 69, also, supports the fence 67 and the lower chute plate 13 as it is tied to the fence. The right bracket 70, also, supports a small transfer deadplate 72 that is interposed between the edge of the table and the fill line conveyor 42. A guard 73 is placed adjacent the table edge along the path of travel of the cartons thereon, and the ends of this guard are supported by the chute plate 13 and the dead plate 72.

With the carton upright adjacent the fence 67 and against the sprocket and the tight portion of the chain, and the table rotating, the carton will move with the table and the chain until the chain leaves the sprocket as it begins its slack run. This movement rotates the carton a quarter turn as the tight and slack runs are at right angles to each other. As the carton moves outwardly of the table along the slack run, the table movement normal to the chain forces the carton against the chain. The movement of the table along the chain is greater than the chain movement at points away from the chain across the carton. This greater movement, or velocity, of the table over the chain of those parts of the table contacting the carton out from the chain, helps the chain lugs 63 push the carton across the dead plate 72 onto the fill line conveyor. This action of the table pushing the carton across the dead plate would not take place materially if the radius of the sprocket 17 were large with respect to the width of the carton. Each carton is moved across the dead plate 72 by one of the chain lugs 63 into position to be taken by the fill line conveyor 42. The speed of the fill line conveyor with respect to the speed of the turntable 14 and transfer chain 62, is such that while the fill line travels the distance between cleats 46 the transfer chain travels the distance between lugs 63. These relative speeds are set by the train value between the transfer driven bevel gear 21 and the fill line conveyor drum 44. That is, the spacing between the chain lugs 63 with respect to the spacing between the conveyor cleats 46 may be equal or unequal, more or less. The timing between the two is such that the transfer device sets a carton between each adjacent pairs of cleats.

Having thus described my invention, its construction and operation, I claim:

1. A transfer conveyor, comprising: a turntable, means for rotatably supporting and rotating said table, a chain drive sprocket secured to, above, and coaxial with said table for rotation therewith, an endless chain in mesh with said drive sprocket, said chain having two runs tangential to said drive sprocket and substantially normal to each other, and two idlers for said chain to give the path thereof a triangular form, carton engaging lugs secured to and spaced equidistantly along said chain to extend outwardly of said path, one of said runs being a tight run and the other a slack run, means for feeding elongated cartons inclined to the upper face of said table adjacent the edge thereof and adjacent said tight run, and means for blocking said carton feed and for normalizing the carton length to said table.

2. The combination of claim 1 in which said drive sprocket has a radius about half that of said table and the difference of said radii being substantially the width of such a carton.

3. The combination of claim 1 in which said means for blocking and normalizing comprises a cam coaxial of and secured to said turntable therebelow, a rocker pivoted below said table and having a follower engaging said cam and an arm having portions thereof adapted to engage such inclined carton, said cam upon rotation with said table actuating said follower and arm to cause said arm portions to engage such inclined carton and normalize it with respect to the upper face of said table while blocking said carton feed.

4. A transfer conveyor, comprising: a turntable, means for rotatably supporting and rotating said table, means for guiding cartons peripherally and radially of said table, means for feeding elongated cartons inclined to the upper face of said table adjacent the edge thereof, and rocker means for blocking said carton feed and for normalizing the carton length to said table.

5. The combination of claim 4 in which said rocker means comprises a cam coaxial of and secured to said turntable therebelow, a rocker pivoted below said table and having a follower engaging said cam and an arm having portions thereof adapted to engage such inclined carton, said cam upon rotation with said table actuating said follower and arm to cause said arm portions to engage such inclined carton and normalize it with respect to the upper face of said table while blocking said carton feed.

References Cited by the Examiner

UNITED STATES PATENTS 3,061,074  10/1962  Musschoot _____ 198—209

FOREIGN PATENTS 769,930  3/1957  Great Britain.

SAMUEL F. COLEMAN, *Primary Examiner.*